United States Patent
Terada et al.

[11] Patent Number: 6,013,364
[45] Date of Patent: Jan. 11, 2000

[54] PLASTIC ARTICLE SURFACE REFORMING METHOD AND PLASTIC ARRANGEMENT THEREBY

[75] Inventors: Akihiko Terada, Tokyo; Masayuki Saito, Isehara; Takashi Toyama, Yokohama; Noritada Nagao, Tokyo; Minoru Fujisawa, Tokorozawa, all of Japan

[73] Assignees: Nissan Motor Co., Ltd., Yokohama; Origin Electric Company Limited, Tokyo, both of Japan

[21] Appl. No.: 08/074,009

[22] Filed: Jun. 9, 1993

Related U.S. Application Data

[63] Continuation of application No. 07/747,477, Aug. 13, 1991, abandoned, which is a continuation of application No. 07/399,567, Aug. 23, 1989, abandoned.

[30] Foreign Application Priority Data

Aug. 23, 1988 [JP] Japan .................................. 63-208565

[51] Int. Cl.[7] ................................ B32B 5/16; B32B 27/00
[52] U.S. Cl. .................. 428/332; 428/423.1; 428/424.2; 428/424.7; 428/904; 427/457
[58] Field of Search ................................ 428/423.1, 424.7, 428/424.2, 332, 904; 427/457

[56] References Cited

U.S. PATENT DOCUMENTS

| | | | |
|---|---|---|---|
| 3,836,423 | 9/1974 | Wagner et al. | 264/53 |
| 3,959,049 | 5/1976 | Tanaka et al. | 156/79 |
| 4,230,812 | 10/1980 | Tork et al. | 526/320 |
| 4,382,114 | 5/1983 | Höhlein et al. | 428/423.1 |
| 4,551,387 | 11/1985 | Manabe et al. | 428/336 |
| 4,692,384 | 9/1987 | Pedain et al. | 428/423.1 |
| 5,061,517 | 10/1991 | Speer | 427/140 |

*Primary Examiner*—Terrel Morris
*Attorney, Agent, or Firm*—Foley & Lardner

[57] ABSTRACT

A method of reforming the surface of a plastic article to provide a leather-like touch to the plastic article surface. In this method, a two-liquid type polyurethane paint is prepared and coated on the surface of the plastic article so as to form a coated film having a thickness ranging from 20 to 150 micrometers and having an elongation percentage ranging from 60 to 180% at 20° C., a coefficient of friction ranging from 0.5 to 0.8, and an initial modulus of elasticity ranging from 60 to 150 kg/cm$^2$.

5 Claims, 1 Drawing Sheet

PLASTIC ARTICLE SURFACE REFORMING METHOD AND PLASTIC ARRANGEMENT THEREBY

This application is a continuation of application Ser. No. 07/747,477, filed Aug. 13, 1991 now abandoned, which in turn is a continuation of application Ser. No. 07/399,567, filed Aug. 23, 1989 now abandoned.

BACKGROUND OF THE INVENTION

1. Field of the Invention

This invention relates to a method of reforming the surface of a plastic article to provide a leather-like touch to the plastic article surface, and a plastic arrangement obtained thereby.

2. Description of the Prior Art

A variety of surface reforming methods for plastic articles have been hitherto proposed and put into practical use. One of these methods is coating the surface of a plastic article with a one-liquid type paint whose base resin is acrylic lacquer or chlorinated polyolefine resin, or with a two-liquid type urethane paint whose base resin is acrylic polyol resin. Another is sticking a vinyl chloride skin material on the adhesive-coated surface of a plastic article upon pressing.

However, the former coating method unavoidably provides a hard coating film on the surface of the plastic article because of using the hard base resin, thereby making impossible to realize a soft touch of the plastic article surface. Otherwise, the latter skin material sticking method requires a high precision in sticking operation thereby lowering yield in production and therefore raising production cost.

SUMMARY OF THE INVENTION

It is an object of the present invention to provide an improved method of reforming the surface of an plastic article, by which the plastic article surface can have a soft touch or a leather-like touch while maintaining a high yield in production.

Another object of the present invention is to provide an improved plastic arrangement whose surface has a soft and leather-like touch.

An aspect of the present invention is a plastic article surface reforming method comprised of the step of preparing a two-liquid type polyurethane paint which forms a coated film having an elongation percentage ranging from 60 to 180% at 20° C., a coefficient of friction ranging from 0.5 to 0.8, and an initial modulus of elasticity ranging from 60 to 150 kg/cm$^2$; and the step of coating the polyurethane paint on the surface of the plastic article to form the above-mentioned coated film having a thickness ranging from 20 to 150 micrometers ($\mu$m).

Another aspect of the present invention is to provide an improved plastic arrangement comprised of a plastic article whose surface is coated with a coated film formed of a two-liquid type polyurethane paint. The coated film has an elongation percentage ranging from 60 to 180% at 20° C., a coefficient of friction ranging from 0.5 to 0.8, and an initial modulus of elasticity ranging from 60 to 150 kg/cm$^2$, and has a thickness ranging from 20 to 150 micrometers ($\mu$m).

By virtue of the coated film, the surface of the plastic article can be provided with a soft and leather-like touch. Additionally, coating the polyurethane paint does not require a much higher precision thereby maintaining a high yield in production.

BRIEF DESCRIPTION OF THE DRAWINGS

A single FIGURE (FIG. 1) is a fragmentary sectional view of a plastic arrangement in accordance with the present invention.

DETAILED DESCRIPTION OF THE INVENTION

Figure 1:
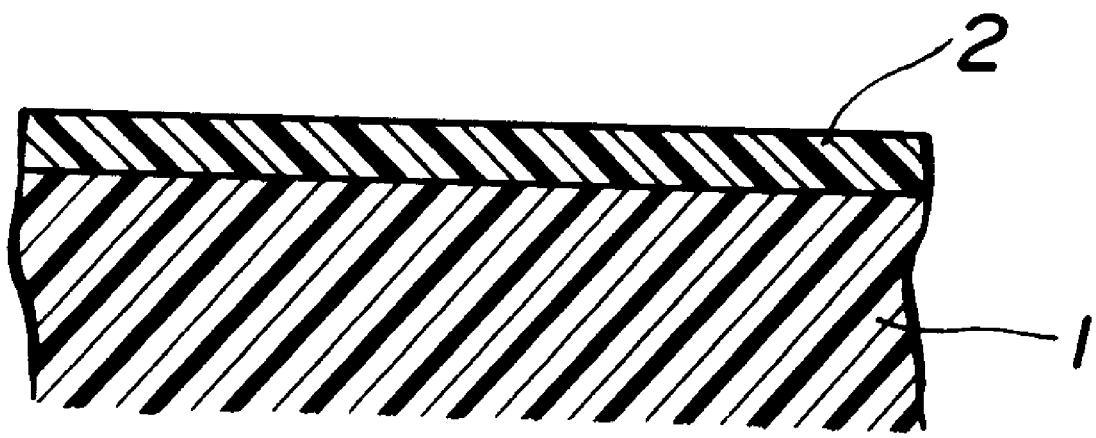

According to the present invention, a plastic arrangement is comprised of a plastic article, and a coated film on the surface of the plastic article and formed of a two liquid type polyurethane paint. The coated film has an elongation percentage ranging from 60 to 180% at 20° C., a coefficient of friction ranging from 0.5 to 0.8, and an initial modulus of elasticity ranging from 60 to 150 kg/cm$^2$, the coated film having a thickness ranging from 20 to 150 micrometers ($\mu$m).

The above-plastic arrangement is obtained by the following method of reforming the surface of the plactic article, comprising the steps of: preparing the two-liquid type polyurethane paint which forms the coated film having the elongation percentage of 60 to 180% at 20° C., the coefficient of friction ranging from 0.5 to 0.8, and the initial modulus of elasticity ranging from 60 to 150 kg/cm$^2$; and coating said polyurethane paint on the surface of the plastic article to form the coated film having a thickness ranging from 20 to 150 micrometers ($\mu$m).

The above-mentioned coated film of the two-liquid type polyurethane paint provides a leather-like touch to the surface of the plastic article. Examples of the plastic article to be surface-reformed are plastic parts such as automotive plastic parts made of acrylonitrile butadiene styrene (ABS) copolymer resin, polypropylene (PP) resin, polypropylene composite material, or the like. The leather-like touch of the plastic article surface is obtained by combination of the following three feelings: (1) sliding feeling represented by the coefficient of friction; (2) sliminess represented by initial modulus of elasticity; and (3) soft feeling represented by elongation percentage.

In this connection, in order to provide the leather-like touch to the surface of the plastic article, it is effective to coat the surface of the article with the coated film of the two-liquid type soft polyurethane paint having the coefficient of friction ranging from 0.5 to 0.8, the initial modulus of elasticity ranging from 60 to 150 kg/cm$^2$, and the elongation percentage ranging from 60 to 180% at 20° C., in a thickness ranging from 20 to 150 micrometers ($\mu$m). Concerning the coefficient of friction, if it is smaller than 0.5, the coated film has a plastic-like touch; while if it is larger than 0.8, the coated film has a rubber-like touch. Concerning the initial modulus of elasticity, if it is larger than 150 kg/cm$^2$, the coated film has a hard touch; while if it is smaller than 60 kg/cm$^2$, the coated film is too low in strength. Concerning the elongation percentage, if it is smaller than 60%, an insufficient soft touch is provided in the coated film; whereas if it is larger than 180%, an adhesiveness is felt in the coated film. Additionally, if the thickness of the coated film is less than 20 micrometers ($\mu$m), a soft touch of the coated film cannot be obtained. If the thickness of the coated film exceeds 150 micrometers ($\mu$m), a relatively long time is required for spray-painting of the polyurethane paint while causing troubles such as dropping or puddle of the paint.

As the two-liquid type polyurethane paint, a two-liquid type polyester system urethane paint hardened by isocyanate is preferably used. Of the two-liquid type polyester system urethane paints, a two-liquid type polyester polyol system polyurethane paint is most preferable. Although a melamine-hardened type polyester system polyurethane paint and a two-liquid type acrylic urethane system polyurethane paint may be proposed as a paint which is higher in elongation percentage and elasticity of a coated film, they are insufficient in balance of flexibility and various performances, in which particularly the former requires a high temperature baking or compulsory drying and therefore a heat resistance is necessary for the plastic article to be coated with the film of the polyurethane paint.

It is preferable that the polyester polyol of the two-liquid type polyester system polyurethane paint has a number average molecular weight ranging from 1000 to 5000 and a hydroxyl value ranging from 60 to 200 and is excellent in flexibility. In this connection, if the number average molecular weight is less than 1000, the coated film has a tendency to be brittle; whereas if the same molecular weight exceeds 5000, the solubility of the polyurethane paint to solvent lowers so that spraying operational efficiency is lowered causing threading of the paint and an insufficient thickness of the coated film of the paint. If the hydroxyl value is smaller than 60, the coated film is lower in toughness; whereas if it exceeds 200, the coated film becomes too hard to obtain a soft touch of the coated film.

Examples of the hardener for the two-liquid type polyester system polyurethane paint are a variety of modified polyisocyanates such as of hexamethylene diisocyanate (HMDI) system, isophorone diisocyanate (IPDI) system, xylene diisocyanate (XDI) system and the like system. Of these polyisocyanates, one of HMDI system is most preferable because of being excellent in extendability and elasticity of the resultant coated film and in weatherability, adhering ability, water resistance and the like performances which are required for a paint for plastic parts such as automotive plastic parts. It is preferable that the added amount of the hardener is decided from an equivalent weight ratio (NCO group/OH group) between the isocyanate group and the hydroxy group of polyester polyol, ranging from 0.5 to 2.0. In this connection, if the equivalent weight ratio is less than 0.5, there remains much unreacted hydroxy groups and therefore the resultant coated film is low in hardenability and durability; whereas if it exceeds 2.0, the coated film is lowered in flexibility and adhering ability because of side reaction of excessive polyisocyanate.

Thus, according to the present invention, the plastic arrangement as shown in FIG. 1 is obtained. The plastic arrangement includes the plastic article 1 whose surface is coated with the coated film 2 resultant from the two-liquid type polyurethane paint. The coated film 2 has a thickness ranging from 20 to 150 micrometers ($\mu$m) and has an elongation percentage ranging from 60 to 180% at 20° C., a coefficient of friction ranging from 0.5 to 0.8, and an initial modulus of elasticity ranging from 60 to 150 kg/cm$^2$.

In order to evaluate the plastic arrangement and the plastic article surface reforming method of the present invention, Examples will be discussed hereinafter with reference to Comparative Examples which are not within the scope of the present invention.

EXAMPLES 1 TO 4

According to a blended ratio (parts by weight) of each of Examples 1 to 4 in Table 1, first respective components except for delustering agent were kneaded for 2 hours in a paint shaker (produced by Toyoseiki Co., Ltd.). Then the delustering agent was added and stirred for about 10 minutes by using a high speed disperser thereby to obtain a principal ingredient. Thereafter, to 25 parts by weight of the thus obtained principal ingredient, 10 parts by weight of polyisocyanate resin (HMDI system) varnish (trade name "Polyhard R" of Origin Electric Co., Ltd.) as a hardener and a mixture solvent of xylene and butyl acetate in equivalent amount were added thereby obtaining a mixture, so that the spraying viscocity of the mixture was adjusted to 20 seconds (by Ford cup No. 4 at 20° C.) thus obtaining paint compositions of Examples 1 to 4.

Subsequently, each of the thus obtained paint compositions of Examples 1 to 3 was coated on the surface of a plastic material (A) made of ABS resin (trade name "TRB" of Mitsubishi Rayon Co., Ltd.) according to the following procedure: First the ABS resin plastic material was wiped with isopropyl alcohol to remove grease. Then, each paint composition of Examples 1 to 3 was coated on the surface of the plastic material to form a coated film having a thickness of 60 micrometers ($\mu$m) and set at room temperature for 10 minutes. Thereafter, the thus coated film was compulsorily dried at 80° C. for 40 minutes thus obtaining each specimen of Examples 1 to 3.

The paint composition of Example 4 was coated on the surface of a plastic material (B) made of polypropylene (trade name "K-7030R" of Chisso Co., Ltd.) according to the following procedure: First the plastic material (B) was subjected to vapour cleaning with 1,1,1-trichloroethane for 1 minute. Then, the surface of the plastic material was coated with a primer (trade name "Planet PP Primer Gray K-3" of Origin Electric Co., Ltd.) whose coating viscosity was adjusted at 11 seconds (by Ford cup No. 4 at 20° C.) under a dilution ratio of 10 (paint)/4 (thinner: trade name "Planet Thinner No. 301" of Origin Electric Co., Ltd.) thereby to form a film having a thickness of 10 to 15 micrometers ($\mu$m). Then, the thus coated primer film was set at room temperature for 10 minutes. Subsequently, the paint composition of Example 4 was coated by an air spray to form a coated film having a thickness of 60 micrometers ($\mu$m) and set at room temperature for 10 minutes. Thereafter, the coated film was compulsorily dried at 80° C. for 40 minutes thus obtaining a specimen of Example 4.

TABLE 1

| | Principal ingredient (parts by weight) | | | |
|---|---|---|---|---|
| Component | Example 1 | Example 2 | Example 3 | Example 4 |
| Polyester polyol resin varnish I | 40.0 | — | — | 40.0 |
| Polyester polyol resin varnish II | — | 30.0 | — | — |
| Polyester polyol resin varnish III | — | — | 32.0 | — |
| Pigment | | | | |
| Titanium dioxide | 10.0 | 10.0 | 10.0 | 10.0 |
| Carbon black | 1.0 | 1.0 | 1.0 | 1.0 |
| Additive | 0.5 | 0.5 | 0.5 | 0.5 |
| dibutyltinlaurate | 0.02 | 0.02 | 0.02 | 0.02 |
| Solvent | 36.5. | 48.5 | 46.5 | 36.5 |
| delustering agent | 12.0 | 10.0 | 10.0 | 12.0 |
| Total | 100.02 | 100.02 | 100.02 | 100.02 |

The components shown in Table 1 will be explained in detail hereinafter.

The polyester polyol resin varnish I was a resin solution which consisted of 80 parts by weight of a soft polyester polyol resin having a number average molecular weight of 3500, a hydroxyl value 100, and an acid value of 5; and 20 parts by weight of a mixture solvent of toluene and methylisobutylketone (MIBK) in equivalent amount.

The polyester polyol resin varnish II was a resin solution which consisted of 80 parts by weight of a polyester polyol resin having a number average molecular weight of 2000, a hydroxyl value of 155 and an acid value of 7; and 20 parts by weight of a mixture solvent of xylene and methylisobutylketone in equivalent amount.

The polyester polyol resin varnish III was a resin solution which consisted of 80 parts by weight of a soft polyester polyol resin having a number average molecular weight of 2500, a hydroxyl value of 145 and an acid value of 2; and 20 parts by weight of butyl acetate.

The titanium dioxide was of trade name "CR-600" of Ishihara Sangyo Co., Ltd.

The carbon black was of trade name "MA-100" of Mitsubishi Chemical Industries Ltd.

The additive was of trade name "DC-3" of Toray Silicone Co., Ltd.

The solvent was a mixture solvent of toluene and methylisobutylketone in equivalent amounts.

The delustering agent was of trade name "Sairoido 161" of Fuji Devison Chemistry Co., Ltd.

With respect to the specimens which were obtained by coating the plastic materials with the respective paint compositions of Examples 1 to 4, evaluation tests were conducted to evaluate coating film performance. Additionally, physical property tests were also conducted as described below.

The elongation percentage and the initial modulus of elasticity were measured as follows: Each of the paint compositions of Examples 1 to 4 was coated on the surface of a test piece made of polypropylene to form a coated film having a thickness of about 100 micrometers ($\mu$m). The thus formed coated film of the paint composition was compulsorily dried at 80° C. for 40 minutes. Then, a knife cut of 5 mm width was made in the coated film to peel out a 5 mm width coated film (a test piece). The elongation percentage and the initial modulus of elasticity of the test piece were measured by a tensile tester (of Tensiron STM type) produced by Orientech Co., Ltd. This measurement was conducted under the condition in which the length of the specimen was 6 mm; the tensioning speed to the specimen was 5 mm/min; and the temperature was 20° C. It will be understood that the elongation percentage is a percentage of the length of elongation of the specimen relative to the original length of the specimen. It is to be noted that the coated film of a paint composition of Comparative Example 3 was too brittle to produce a test piece and therefore could not be subjected to the measurement of the elongation percentage and the initial modulus of elasticity.

The coefficient of friction of the coated film of the specimen was measured by a measuring device (trade name "KES-FB4" of Katotech Co., Ltd. This measurement was conducted under a condition in which load was 50 g; pressure was 10 g; and specimen moving speed was 0.1 cm/sec.

The test results of the above-measurements are shown in Table 2.

COMPARATIVE EXAMPLE 1

A specimen of Comparative Example 1 was obtained in the same manner as in Example 1 with the exception that a coated film has a thickness of 15 micrometers ($\mu$m).

COMPARATIVE EXAMPLE 2

To 40 parts by weight of a two-liquid type acrylic urethane system paint (for ABS resin) of the trade name "Planet PZ Delustered Gray" of Origin Electric Co., Ltd, 10 parts by weight of the same hardener as in Example 1 and a mixture solvent of xylene and butyl acetate in equivalent amount were added thereby obtaining a mixture. The spraying viscosity of the mixture was adjusted to 14 seconds (by Ford cut No. 4 at 20° C.) thereby obtaining a paint composition of Comparative Example 2. Subsequently, the thus obtained paint composition of Comparative Example 2 was coated on the surface of the plastic material (A) in the same manner as in Example 1, thus obtaining a specimen of Comparative Example 2. The thus obtained specimen was subjected to the evaluation tests for the coated film performance in the same manner as in Example 1. Additionally, physical property tests for the paint composition of Comparative Example 2 were conducted in the same manner as in Example 1. The test results are shown in Table 2.

COMPARATIVE EXAMPLE 3

A mixture solvent of xylene and butyl acetate in equivalent amount was added to a one-liquid type acrylic lacquer system paint (for ABS resin) of the trade name "Planet AX Delustered Gray" of Origin Electric Co., Ltd so that the spraying viscosity of the mixture was adjusted to 12 seconds (by Ford cut No. 4 at 20° C.), thereby obtaining a paint composition of Comparative Example 3. Subsequently, the thus obtained paint composition of Comparative Example 3 was coated on the surface of the same plastic material in the same manner as in Example 1, thus obtaining a specimen of Comparative Example 3. The specimen was subjected to the evaluation tests for the coated film performance in the same manner as in Example 1. Additionally, a physical property test for the paint composition of Comparative Example 3 was conducted in the same manner as in Example 1. The test results are shown in Table 2.

TABLE 2

| Item | Example 1 | Example 2 | Example 3 | Example 4 | Comparative Example 1 | Comparative Example 2 | Comparative Example 3 |
| --- | --- | --- | --- | --- | --- | --- | --- |
| Plastic material | A | A | A | B | A | A | A |
| Coated film thickness ($\mu$m) | 60 | 60 | 60 | 60 | 15 | 30 | 20 |
| Physical Property | | | | | | | |
| Coefficient of friction | 0.8 | 0.7 | 0.5 | 0.8 | 0.8 | 0.2 | 0.15 |
| Initial modulus of elasticity (kg/cm$^2$) | 60 | 100 | 150 | 60 | 60 | 5000 | — |
| Elongation percentage (%) | 60 | 90 | 180 | 60 | 60 | 30 | — |
| Coated film | | | | | | | |

TABLE 2-continued

| Item | Example 1 | Example 2 | Example 3 | Example 4 | Comparative Example 1 | Comparative Example 2 | Comparative Example 3 |
|---|---|---|---|---|---|---|---|
| performance | | | | | | | |
| Glossiness *1 | 3.0 | 3.0 | 4.0 | 3.0 | 2.5 | 3.0 | 3.0 |
| Touch *2 | Soft | Soft | Soft | Slightly Hard | Hard | Hard | Hard |
| Close adhesion *3 | acceptable | acceptable | acceptable | acceptable | acceptable | acceptable | acceptable |
| Water resistance *4 | acceptable | acceptable | acceptable | acceptable | acceptable | acceptable | acceptable |
| Humidity resistance *5 | acceptable | acceptable | acceptable | acceptable | acceptable | acceptable | acceptable |
| Heat resistance *6 | acceptable | acceptable | acceptable | acceptable | acceptable | acceptable | acceptable |
| Weatherability *7 | acceptable | acceptable | acceptable | acceptable | acceptable | acceptable | acceptable |

*1: Mirror reflectivity (60 degrees)
*2: Hand's direct contact with coated film
*3: Close adhesion of adhesive tapes crossing each other
*4: Appearance and close adhesion after dipping in warm water at 40° C. for 120 hours
*5: Appearance and close adhesion after allowing to stand in atmosphere of 98% RH for 240 hours
*6: Appearance and close adhesion after allowing to stand at 90° C. for 500 hours
*7: Sunshine-weatherometer 300 hours (without shower, B.P.T: 83° C.)

What is claimed is:

1. A method of reforming a surface of a plastic article to provide a leather-like touch to the surface of the plastic article, comprising:

preparing a two-liquid polyurethane paint which forms a coated film having an elongation percentage ranging from 60 to 180% at 20° C., a coefficient of friction ranging from 0.5 to 0.8, and an initial modulus of elasticity ranging form 60 to 150 kg/cm$^2$; and coating said polyurethane paint on the surface of the plastic article to form said coated film having a thickness ranging from 20 to 150 micrometers;

said two-liquid polyurethane paint being a polyester polyol system including polyester polyol and hexamethylene diisocyanate, said polyester polyol having a number average molecular weight ranging from 1000 to 5000 and a hydroxyl value ranging from 60 to 200, wherein an equivalent weight ratio between the isocyanate group and the hydroxy group in the polyester polyol is within a range from about 1:2 to 2:1.

2. A method as claimed in claim 1, wherein said plastic article is made of a plastic material selected from the group consisting of acrylonitrile butadiene styrene copolymer resin, polypropylene resin, and polypropylene composite material.

3. A plastic arrangement having a leather-like surface touch, comprising:

a plastic article; and a coated film on a surface of said plastic article and formed of a two-liquid polyurethane paint, said coated film having an elongation percentage ranging from 60 to 180% at 20° C., a coefficient of friction ranging from 0.5 to 0.8, and an initial modulus of elasticity ranging from 60 to 150 kg/cm$^2$, said coated film having a thickness ranging from 20 to 150 micrometer, said two-liquid polyurethane paint being a polyester polyol system including polyester polyol and hexamethylene diisocyanate, said polyester polyol having a number average molecular weight ranging from 1000 to 5000 and a hydroxyl value ranging from 60 to 200, wherein an equivalent weight ratio between the isocyanate group and the hydroxy group in the polyester polyol is within a range from about 1:2 to 2:1.

4. A plastic arrangement as claimed in claim 3, wherein said plastic article is made of a plastic material selected from the group consisting of acrylonitrile butadiene styrene copolymer resin, polypropylene resin, and polypropylene composite material.

5. A plastic arrangement having a leather-like surface touch, comprising:

a plastic article; and a coated film on a surface of said plastic article, said coated film having an elongation percentage ranging from 60 to 180% at 20° C., a coefficient of friction ranging from 0.5 to 0.8, and an initial modulus of elasticity ranging from 60 to 150 kg/cm$^2$, said coated film having a thickness of 20 to 150 micrometer, said coated film being formed by coating a two-liquid polyurethane paint on the surface of the plastic article, said two-liquid polyurethane paint being a polyester polyol system including polyester polyol and hexamethylene diisocyanate, said polyester polyol having a number average molecule weight ranging from 1000 to 5000 and a hydroxyl value ranging from 60 to 200, wherein an equivalent weight ratio between the isocyanate croup and the hydroxy group in the polyester polyol is within a range from about 1:2 to 2:1.

* * * * *